United States Patent [19]

Loucks

[11] Patent Number: 5,073,830
[45] Date of Patent: Dec. 17, 1991

[54] HIGH-EFFICIENCY POLARIZED LIGHT SOURCE

[75] Inventor: Bryan E. Loucks, Los Altos Hills, Calif.

[73] Assignee: Greyhawk Systems, Inc., Milpitas, Calif.

[21] Appl. No.: 462,416

[22] Filed: Jan. 9, 1990

[51] Int. Cl.⁵ .............................................. G02B 27/28
[52] U.S. Cl. ..................................................... 359/495
[58] Field of Search ............... 350/394, 401, 404, 420, 350/172, 173; 353/20, 31, 34

[56] References Cited

U.S. PATENT DOCUMENTS

| | | | |
|---|---|---|---|
| 2,274,110 | 2/1942 | Ward, Jr. | 350/401 |
| 3,497,283 | 2/1970 | Law | 350/394 |
| 4,125,843 | 11/1978 | Whitby | 350/401 |
| 4,461,542 | 7/1984 | Gagnon | 350/401 |
| 4,560,999 | 12/1985 | Tokuhara | 350/401 |
| 4,564,931 | 1/1986 | O'Hara et al. | 350/401 |
| 4,744,073 | 5/1988 | Sugiki | 350/420 |
| 4,800,556 | 1/1989 | Charlier et al. | 350/401 |
| 4,804,264 | 2/1989 | Kirchhofer et al. | 350/401 |
| 4,827,334 | 5/1989 | Johnson et al. | 350/401 |
| 4,850,685 | 7/1989 | Kamakura et al. | 350/401 |
| 4,864,390 | 9/1989 | McKechnie et al. | 358/60 |
| 4,936,658 | 6/1990 | Tanaka et al. | 350/408 |
| 4,962,997 | 10/1990 | Baldwin | 350/172 |

Primary Examiner—Bruce Y. Arnold
Assistant Examiner—Martin Lerner
Attorney, Agent, or Firm—Flehr, Hohbach, Test, Albritton & Herbert

[57] ABSTRACT

An optical system is disclosed which combines a collimating lens with a half wave plate, a polarizing beam splitter, and imaging optics to create a polarized image of a non-polarized light source. This optical system has significant benefits of energy efficiency and brightness.

3 Claims, 3 Drawing Sheets

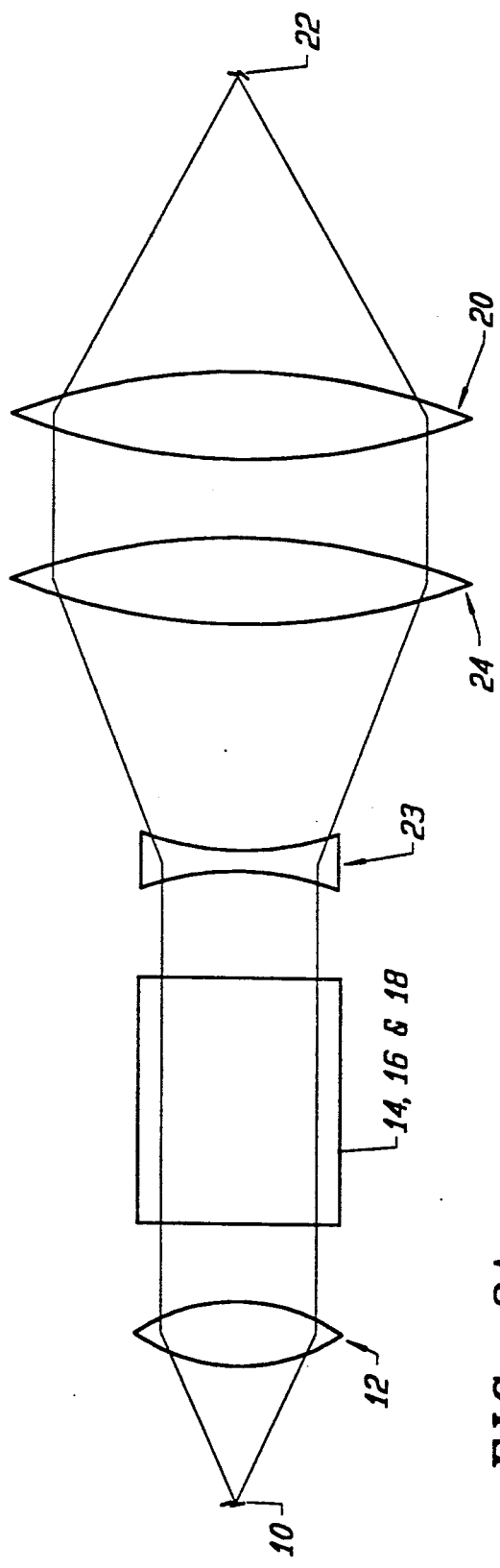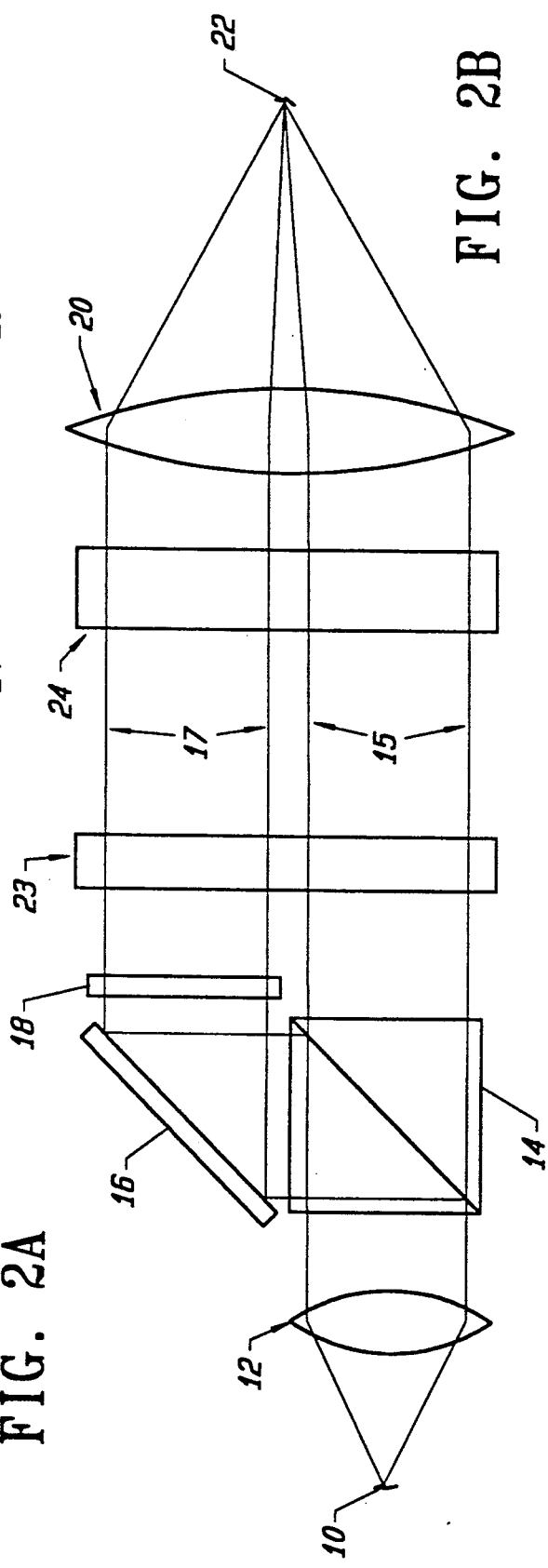

HIGH-EFFICIENCY POLARIZED LIGHT SOURCE

BACKGROUND OF THE INVENTION

1. Field of the Invention

This invention relates to an improved efficiency polarized light source. More particularly, it describes an apparatus for and method of recovering optical energy normally discarded in converting a source of non-polarized light to polarized light.

2. Summary of the Prior Art

Linearly polarized light, also called plane polarized light, is light for which the spatial orientation of its electric field lies entirely within one plane. There are numerous devices which use linearly polarized light. Many light valves and optical processors need linearly polarized light. Often in order to polarize a light beam, the beam is passed through a polaroid sheet or polarizing beam splitter. Theoretically, the polarizing process consists of separating any two orthogonal components of the electric field.

In the prior art, two methods of producing polarized light, reflection and absorption, are used. Both methods are inefficient. If a polarizing sheet is used, then the energy of one of the polarization states is simply absorbed. If a polarizing beam splitter is used then the light consisting of the second polarization state is deflected away from the primary optical path and allowed to dissipate. In both methods roughly half of the energy of the initial light source is lost. For many applications this is not important. However, there are certain applications where the efficiency with which non-polarized light is converted to polarized light is important.

Relevant prior art includes U.S. Pat. No. 4,516,837 issued to Soref et al., and U.S. Pat. No. 4,461,543, issued to McMahon. Both patents use related combinations of components, but for different purposes. Both Soref and McMahon describe optical switches for optical transmissive systems and both use polarizing beam splitters to create two or more polarized light beams which can then be modulated. The modulated beam may then be recombined to create a single switchable non-polarized light beam. The apparatus does not provide a source of polarized light with improved efficiency.

OBJECTIVES OF THE INVENTION

It is an objective of this invention to provide increased efficiency in conversion of non-polarized light into polarized light.

It is another objective of this invention to provide increased brightness of a polarized light source.

SUMMARY OF THE INVENTION

The attainment of these and related objectives may be achieved through the use of the optical polarization system herein described. This invention has a source of unpolarized light, a polarizing means for separating the non-polarized light into two beams with perpendicular polarizations, a projecting means for relaying the light to the polarizer, a retarding means for rotating the axis of polarization of one of the beams by 90 degrees, and light collection and focusing means for focusing the polarized light of both beams to create a polarized image of the source.

BRIEF DESCRIPTION OF THE DRAWINGS

FIG. 2A is a top view of an alternate embodiment utilizing an anamorphic telescope.

FIG. 2B is a side view of the embodiment of FIG. 2A.

DETAILED DESCRIPTION OF THE INVENTION

Figure 1:
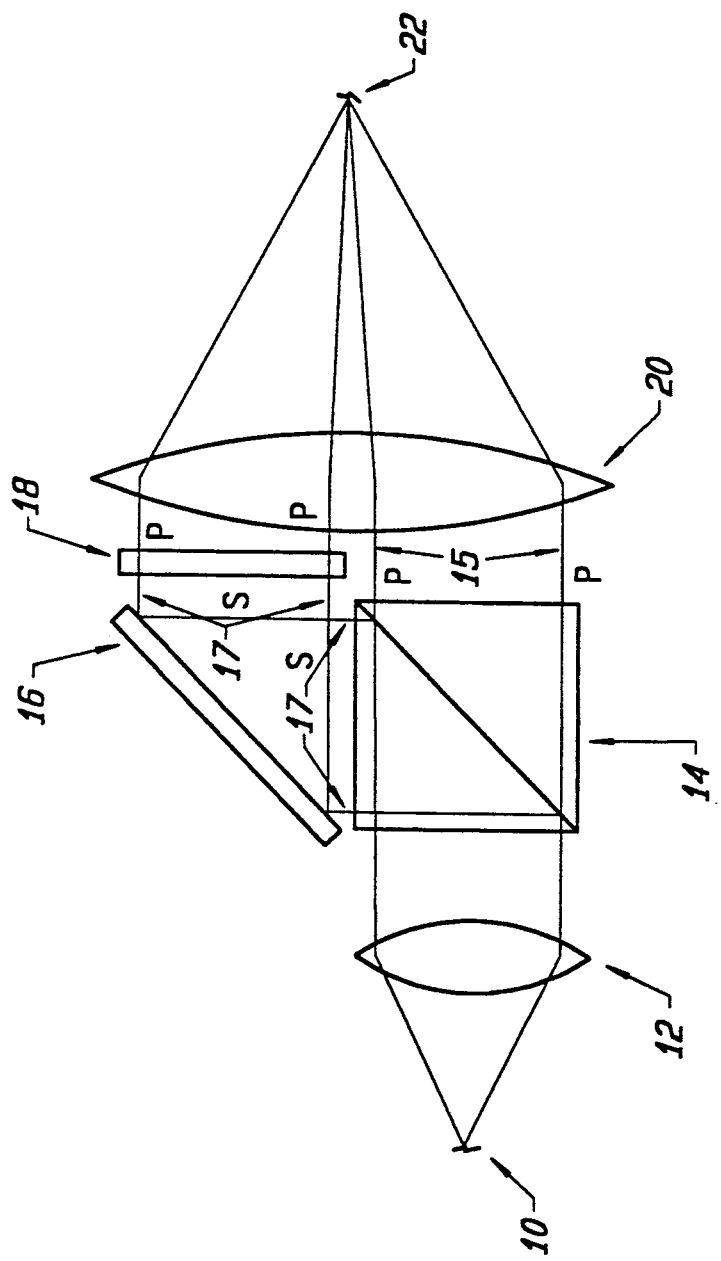
FIG. 1 is a illustrative schematic diagram of a preferred embodiment of the invention.

Referring now to FIG. 1, a preferred embodiment consists of a non-polarized light source 10, a collimating lens 12, a polarizing beam splitter 14, a folding mirror 16, a retardation plate 18, and an image combining lens 20. Light source 10 may be any of a number of devices such as an incandescent lamp, an arc lamp, a metal halide lamp or a laser. A Spectra-Physics model 145-02 HeNe laser has been used with good results. Light from source 10 passes through the collimating lens 12 so that the rays are now substantially parallel. A Melles Griot model #09LBM007 Beam Expander was used with good results for this purpose. The acceptable limits of departure from parallel are determined by the specifications of polarizer 14, as will be explained.

Light from collimating lens 12 is projected into polarizer 14. This component could be, for example, a polarization separation prism which allows the light polarized parallel to a preferred axis through, while reflecting light polarized perpendicular to that axis. A Mac-Neille polarizing cube is an example of such a device. A CVI Laser Corporation model #PBSH 10-V was used for the polarizing beam splitter 14 in this embodiment. For the polarizing beam splitter 14 to function properly, light entering it must be substantially parallel. The maximum angle formed by light rays should be less than approximately 6 to 10 degrees. This restriction, along with the distance of lens 12 from the source 10 and focal length of the lens 12 will also determine the maximum size of the image source.

Polarizer 14 passes a beam of light 15. Light beam 15 is composed of light of a specific polarization and contains half of the energy of the non-polarized beam from collimator 12. The remaining half of the energy is polarized perpendicularly to the light in light beam 15. This light energy is in the form of a beam represented by rays 17 and, in the example shown in FIG. 1, leaves polarizer 14 at right angle to beam 15. Beam 17 is collected and redirected by mirror 16 onto half wave plate 18 (or retardation plate 18). The reflective material of folding mirror 16 is chosen so that its reflection characteristics are insensitive to the polarization of the incident light. A CVI Laser Corporation right angle prism model #BPOB-1 was used for the folding mirror 16.

Retardation plate 18 is one of a class of optical components that changes the state of the polarization of the incoming light. In this embodiment wave plate 18 is biaxial crystal mica. This material was chosen because it has an almost constant birefringence over a large spectral range from visible to infrared. Birefringent materials separate an incident light beam into orthogonally polarized components, slow the component along the extraordinary axis with respect to the component along the ordinary axis, and then recombine the components into a single beam with a new polarization. Alternate materials for the retardation plate 18 are ZnS, MgF2, and ZrO$_2$. If only a narrow bandwidth of light is used then quartz could be used.

In the preferred embodiment, the retardation plate 18 is a half wave plate, which when properly oriented, rotates the polarization of incident light by 90 degrees.

In the preferred embodiment, the half wave plate 18 is oriented such that the polarization of the light beam passing through is rotated to match that of beam 15. A suitable half wave plate 18 is a Melles Griot, model #02WRM025.

In an alternative arrangement, the retarding plate 18 could be a quarter wave plate placed in close proximity to a mirror, rather than a half wave plate that is separated from the mirror. In such an embodiment, the light would travel through the quarter wave plate to become circularly polarized, then be reflected off a mirror, and travel back out through the quarter wave plate to become polarized at 90 degrees to its initial state.

Both beams 15 and 17 are then passed through an imaging lens 20 and are focused at a common location 22 to form a polarized image of the source. Imaging lens 20 has the effect of focusing the polarized light from a point source, in source 10, through both beams 15 and 17 to a point in space in image location 22. A suitable imaging lens is a Schneider Xenar 210 mm f/4.5.

Polarized light source 22 may then be used as an input to a optical system requiring polarized light. In particular, source 22 is useful as a source of polarized light for a video projector using a liquid crystal light valve. In this application, polarized light is required and a design objective is to achieve maximum brightness from a conventional office source of power, typically 110 volts, 20 amps.

Referring to FIGS. 2A and 2B (which are perpendicular views of the same apparatus), an enhanced feature of the preferred embodiment of FIG. 1 is shown. The light at each point of the polarized image 22, while of one polarization, will have different numerical apertures in the two orthogonal directions. The angular spread in one axis of the incoming light at a particular point will be twice the angular spread of the other axis. Often, for example, in some projection systems, this is not important. However, many optical processing systems require equal numerical apertures.

In FIGS. 2A and 2B, an anamorphic telescope consisting of two lenses 23 and 24 magnify the beam in one direction only before it enters the imaging lens 20. An anamorphic telescope has different magnifications in two perpendicular directions. In this situation, the numerical apertures of the combined beam will be substantially uniform but the image will be distorted compared to the shape of the original source. For instance, if the anamorphic magnification is 2 in one direction and 1 in the other direction, and the input light source was square, the output image would be a rectangle with a 2:1 aspect ratio. In many projection systems where the image is rectangular, this can be a desireable condition.

Figure 3:
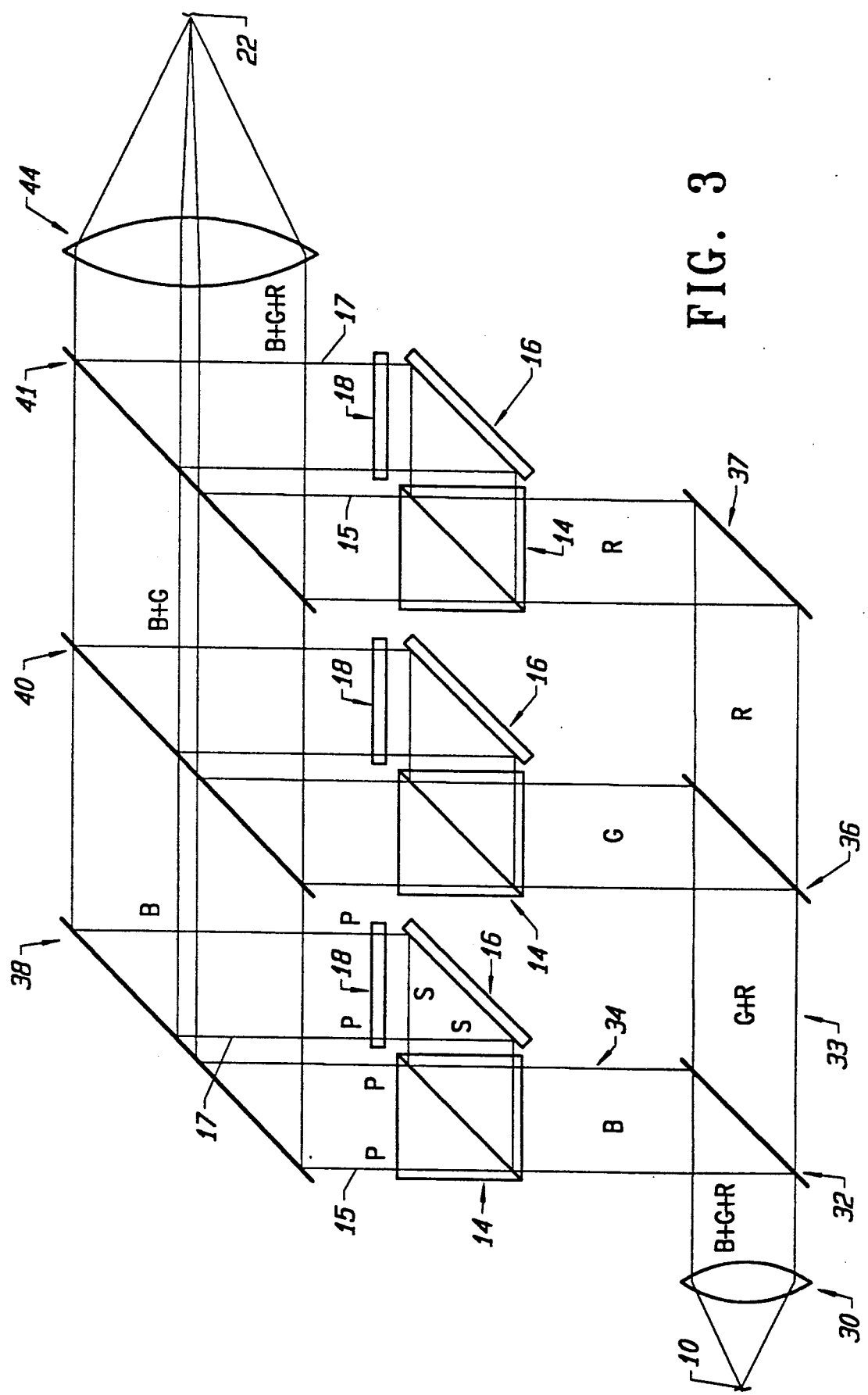
FIG. 3 is a schematic diagram of an alternate embodiment utilizing dichroic mirrors.

Referring to FIG. 3, an alternate embodiment of the present invention is illustrated. The light from the collimating lens 30 (which functions the same as lens 12 of FIG. 1) impinges upon a dichroic beam splitter 32 at some non-normal angle. The beam splitter 32 will reflect one color of the light, ideally the shortest wavelength band desired, and let the remaining light pass. Dichroic beam splitters perform the function of separating an incoming beam of optical radiation into a first output beam composed of wavelengths greater than some critical wavelength and an second output beam with wavelengths less than that critical wavelength. Dichroic beam splitters are well known in the art.

In FIG. 3, dichroic beam splitter 32 splits white light from lens 30 into beam 33 with wavelength greater than $W_1$ and beam 34 with wavelength less than $W_1$. Beam 33 will similarly impinge upon a second dichroic beam splitter 36 which passes light with a wavelength greater than $W_2$ and reflects light with wavelength less than $W_2$. This process may be repeated until the incoming light has been divided into an arbitrary number of individual beams, each having a different wavelength band. In the embodiment of FIG. 3, two beam splitters 32 and 36 are utilized to create three beams of the primary colors. For example, beam splitter 32 reflects blue light, letting red and green pass, beam splitter 36 reflects green light, letting red pass. The remaining light is reflected by a mirror 37. The present invention, however, is not limited to these wavelengths and may be practiced with other wavelengths well known in the art.

Each of these beams may then be regarded as an input beam to the polarizers 14, folding mirrors 16, and half-wave plates 18 to produce beams 15 and 17 (previously described). The resulting individually colored polarized beams may then be recombined by a mirror 38 and a series of dichroic combiners 40 and 41 (similar to those originally use to separate the incoming white light). Dichroic combiner 40 allows light with wavelengths less than $W_1$ to pass through, and reflects light with a wavelength greater than $W_1$. Dichroic combiner 41 allows light with wavelengths less than $W_2$ to pass through, and reflects light with a wavelength greater than $W_2$. The polarized light beam can then be focused by an image lens 20, forming a source of polarized white light. Although this method is complex it does permit a more efficient capture of the otherwise wasted energy and a more efficient conversion of the primary path through the polarizing beam splitter. Because only a narrow band of light is passed through each component, polarizing optics can be optimized to be efficient when used for a particular designed wavelength.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A polarization system consisting of:
   a light source;
   collimating means for aligning light from said light source into a first beam consisting of substantially parallel light rays;
   first splitting means for splitting said first beam into a first plurality of beams, each of said first plurality of beams having a substantially different wavelength band;
   a plurality of second splitting means for splitting said first plurality of beams into a second and third plurality of beams, said second and third pluralities of beams having substantially perpendicular polarization states;
   a plurality of retarding means for changing the polarization of said second plurality of beams such that said second and third pluralities of beams consist of substantially parallel polarization states;

a plurality of linearly aligned reflecting means for aligning said second and third plurality of beams to be substantially parallel;

recombining means for combining said second plurality of beams into a single second beam and said third plurality of beams into a single third beam, said second beam and said third beam oriented in a substantially parallel manner; and imaging means for focusing said second and third beams, thereby creating an image with substantially a single polarization, said image being suitable for input to an optical system requiring polarized light.

2. The system of claim 1 wherein said first splitting means consists of a single mirror and at least one dichroic mirror.

3. The system of claim 1 wherein said recombining means consists of a single mirror and at least one dichroic mirror.

* * * * *